United States Patent [19]

Bogan et al.

[11] Patent Number: 4,590,265

[45] Date of Patent: May 20, 1986

[54] CARBOXYLATED CELLULOSE ESTER AND MANUFACTURE THEREOF

[75] Inventors: Richard T. Bogan; Chung-Ming Kuo, both of Kingsport, Tenn.

[73] Assignee: Eastman Kodak Company, Rochester, N.Y.

[21] Appl. No.: 724,747

[22] Filed: Apr. 18, 1985

Related U.S. Application Data

[63] Continuation-in-part of Ser. No. 581,014, Feb. 17, 1984, abandoned, which is a continuation-in-part of Ser. No. 542,233, Oct. 14, 1983, abandoned.

[51] Int. Cl.$^4$ .................... C08B 15/04; C09D 3/18; C09D 11/14
[52] U.S. Cl. ........................................ 536/63; 106/26; 428/425.1; 428/464; 524/37; 536/65; 536/68; 536/76; 536/80
[58] Field of Search ............... 536/63, 65, 68, 76, 536/80; 106/26; 524/37; 428/425.1, 464

[56] References Cited

U.S. PATENT DOCUMENTS

| | | | |
|---|---|---|---|
| 2,105,570 | 1/1938 | Whitehead | 536/79 |
| 3,138,564 | 6/1964 | Borunsky | 527/312 |
| 4,034,764 | 7/1977 | Rainer et al. | 536/63 |
| 4,134,809 | 1/1979 | Pacifici et al. | 428/417 |
| 4,233,354 | 11/1980 | Hagegawa et al. | 106/26 |
| 4,256,492 | 3/1981 | Matsumoto et al. | 106/26 |
| 4,261,946 | 4/1981 | Goyert et al. | 524/37 |
| 4,306,998 | 12/1981 | Wenzel et al. | 524/37 |
| 4,325,997 | 4/1982 | Brewer et al. | |
| 4,342,865 | 8/1982 | Brewer et al. | 536/76 |
| 4,352,901 | 10/1982 | Maxwell et al. | 106/26 |
| 4,357,469 | 11/1982 | Schor | 536/85 |
| 4,389,502 | 6/1983 | Fry et al. | 524/37 |

Primary Examiner—Ronald W. Griffin
Attorney, Agent, or Firm—Donald W. Spurrell; J. Frederick Thomsen

[57] ABSTRACT

The present invention provides a novel cellulosic material and a process for preparing the same. The cellulosic material is a carboxylated cellulose ester material having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$. The carboxylated cellulose esters of the present invention are prepared by reacting a cellulose ester with ozone at a temperature of about 25° to 80° C. for a period of time sufficient to yield the carboxylated cellulose ester product. Also disclosed are end use applications for the carboxylated cellulose esters, such as metal coatings, pigment dispersions, wood coatings, inks, etc.

68 Claims, 1 Drawing Figure

CARBOXYLATED CELLULOSE ESTER AND MANUFACTURE THEREOF

DESCRIPTION

This application is a continuation-in-part of Ser. No. 581,014, filed Feb. 17, 1984, now abandoned, which is a continuation-in-part of U.S. application Ser. No. 542,233, filed Oct. 14, 1983, now abandoned.

BACKGROUND OF THE INVENTION

The present invention relates to a unique, carboxylated cellulosic material and to a process for preparing the same. This novel cellulosic material, which will be referred to herein as "carboxylated cellulose ester" or "XAE", demonstrates a surprising and unexpected combination of properties which makes it useful, for example, in various coating applications, such as automotive finishes, wood coatings, pigment dispersions, inks, lacquers, etc., which will be described in further detail hereinafter.

The oxidative treatment of cellulosic materials has been studied for many years. It is known, for example, that cellulosic materials, including cellulose (in the form of pulp, lint, etc.), cellulose esters, or cellulose ethers, can be bleached by treatment with oxygen or ozone. However, it is widely recognized that such a bleaching treatment occurs extremely rapidly and does not involve any significant reaction with the cellulosic substrate, as evidenced by absence of by-products, little, if any, reduction in molecular weight, etc.

It is further known that cellulose derivatives, such as cellulose esters and cellulose ethers, can be degraded oxidatively by treatment with air or oxygen at elevated temperatures. See, for example, *Proceedings of the Academy Of Sciences of the U.S.S.R.*, Vol. 114, p. 569–571 (1957). It is disclosed therein that oxidative degradation of such cellulose derivatives is accompanied by a reduction in the degree of polymerization and the appearance of by-products, such as acids and aldehydes, caused by cleavage of ether and ester groups. There is no indication that any further chemical processes, such as carboxylation of the cellulosic residue, occurs during the oxidative degradation of cellulose esters.

Chemical modification of cellulose ethers is further described in a number of publications, such as "Mechanism of Ozone Attack on α-Methyl Glucoside and Cellulosic Materials", *Journal of Polymer Science: Part A*-1 Vol. 4, pages 2683–2703 (1966), by A. A. Katai and Conrad Schuerch; U.S. Pat. Nos. 4,226,849; 4,316,982; and 4,357,469. None of these references relates to cellulose esters or processes for the chemical modification thereof.

SUMMARY OF THE INVENTION

In one aspect of the present invention there is provided a process for the preparation of carboxylated cellulose esters. The process comprises the steps of (a) providing a cellulose ester to a reaction zone; (b) intimately contacting the cellulose ester in the reaction zone with a gaseous stream comprising ozone; and (c) reacting the cellulose ester with the ozone at a temperature of about 25° to 80° C. for a period of time sufficient to yield a carboxylated cellulose ester product having an acid number of at least about 5.

The present preferred carboxylated cellulose esters including the acetates, butyrates and propionates are all hereinafter termed XAE and are defined as polymeric chains of anhydroglucose units having ring substituents comprising by weight based on total polymer weight, from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups (terms include water soluble or water dispersible salts thereof) wherein from about 20% to 100%, preferably from about 30% to 100% of these carboxyl groups are non-saponifiable backbone (BBC), i.e., attached at their α-carbons directly to the anhydroglucose rings, and wherein the XAE contains from about $4.52 \times 10^{-5}$ to about $6.13 \times 10^{-4}$ moles of lactone moiety per gram of XAE, hereinafter termed "lactone level". In general, the XAE is further characterized as having an acid number (AN) from about 5 to about 50, a DP/COOH of from about 5 to about 80, and an I.V. (inherent viscosity) of from about 0.07 to about 0.45.

For certain end uses, such as, in free-radical curable coatings, it is highly preferred that the XAE contain stable (relatively) peroxide groups in concentrations of from about 0.05 to about 2.0 meq of $-(-O-O-)-$ per gram of XAE, hereinafter termed "peroxide value". Also, for certain uses given below, the preferred XAE materials have I.V.'s of from about 0.10 to about 0.30, a lactone level of from about $9.68 \times 10^{-5}$ to about $3.22 \times 10^{-4}$, a peroxide value of from about 0.10 to about 0.8, a DP:COOH from about 8 to about 25, and a Hoeppler viscosity reduction factor, hereinafter termed "HVR" and defined below, of 0.01 to 0.95, most preferably from about 0.6 to about 0.95. For general coatings applications the preferred constituent ranges for such XAE material comprise in weight percent:

| Acetyl | 35–44 |
| Propionyl | <1% |
| Butyryl | <1% |
| Hydroxyl | 4–20 |
| Total COOH | 0.5–2.5; | for automotive finishes

| Acetyl | 10–15 |
| Propionyl | 0–4 |
| Butyryl | 30–40 |
| Hydroxyl | 0.5–2.5 |
| Total COOH | 0.7–2.5; and | for printing inks

| Acetyl | 1.0–4.0 |
| Propionyl | 40–47 |
| Butyryl | 0.0–2.0 |
| Hydroxyl | 1.0–2.5 |
| Total COOH | 0.5–2.5 |

With respect to the above characterizations of the present XAE regarding degree of polymerization (DP), and ester content (acetyl, propionyl, butyryl), see pages 118–143 of Kirk-Othmer, "Encyclopedia of Chemical Technology," 3rd Ed., Vol. 5, and the cited references, particularly 111 to 130, on page 141 thereof for methods for their determination.

The inherent viscosities (I.V.) are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. ($\eta$) is calculated from the equation $$(\eta)^{25°\,C}_{0.50\%} = \frac{\ln \frac{t_s}{t_o}}{C}$$

where:
- ($\eta$) = Inherent viscosity at 25° C. at a polymer concentration of 0.5 g./100 ml. of solvent;
- ln = Natural logarithm;
- $t_s$ = Sample flow time;
- $t_o$ = Solvent-blank flow time; and
- C = Concentration of polymer in grams per 100 ml. of solvent = 0.50.

The total carboxyl group content of XAE (backbone and extra-pendant, i.e., non-backbone) is best determined by weak base potentiometric titration using a Brinkmann 636/100 Titoprocessor and Program with E635 Dosimat and Exchange Unit using a Senorex® combination electrode or equivalent. In this method the XAE sample is dissolved in dimethylsulfoxide (DMSO) and titrated potentiometrically with standarized tetramethylguanidine (TMG) in isopropanol. The Titroprocessor controls the delivery of the titrant and provides a plotted curve of potential versus titrant volume. From an automatically determined end point, the Titroprocessor calculates the acid number "AN" and prints it with other parameters of the titration. The calculation is performed by the Titroprocessor on the following titration data
- E1 = ml. of titrant at end point,
- C1 = Factor for converting moles of acid/g. of XAE to mg. of KOH/g. of XAE,
- C2 = Normality of titrant,
- C3 = Blank titration in ml. of titrant at end point, and
- W = Sample weight.

The equation for the calculation is $$AN = \frac{(E1 - C3) \times C2 \times C1}{W}.$$

Typical and actual values for these data and the actual AN calculation for an XAE sample is as follows:

$$AN = \frac{\overset{E1}{(3.171} - \overset{C3}{0.0)} \times \overset{C2}{(0.1090)} \times \overset{C1}{(56.100)}}{\underset{w}{0.8181}} = 23.70;$$

This acid number corresponds to 1.90 wt. % total carboxyl group content in the XAE sample calculated as follows:

Wt. % COOH =

$$\frac{45 \text{ g/mole COOH} \times 100\% \times AN}{56100 \text{ mg/mole KOH}} = (0.0802) \times 23.70 = 1.90$$

The weight % of non-saponifiable backbone carboxyl groups (BBC) is determined by (1) strong base saponification of XAE to eliminate extra-pendant carboxyl groups which may be formed, for example, on the alkyl moieties of the pendant ester groups, (2) reacidification to neutrality, (3) neutralization of the backbone carboxyl groups with barium o-nitrophenolate, (4) analysis for barium content, and (5) calculation of backbone carboxyl content therefrom. An example of this procedure is as follows:

Preparation of Barium o-Nitrophenolate (Reagent A) Stock Solution

Heat 3 l. of distilled water in a 4-l. flask to 75° C. on a steam bath. Add 16.67 g. of barium hydroxide, [Ba(OH)$_2$.8H$_2$O] and 21.67 g. of o-nitrophenol. Stir vigorously for 1 hour at 75° C. and let stand overnight at room temperature. Decant to another flask, heat to 75° C., add 4.17 g. of o-nitrophenol, stir and let stand overnight at room temperature. Decant and filter on a Buchner funnel through Whatman No. 4 paper and adjust the filtrate to 3 l. with distilled water.

Saponification of XAE

100 Grams of XAE is dissolved in 300 g. of methanol and added to 1.0 kg of 5 wt. % aqueous NaOH dropwise with stirring over a 2-hour period at room temperature. The resulting suspended precipitate is stirred for 18 hours at room temperature, the precipitate washed to neutrality on a fritted Buchner funnel with deionized water, and the water pulled off from the precipitate to form a cake.

Reacidification

The cake is suspended in 1.0 liter of 0.1N aqueous HCl at room temperature for 4 hours, the solids collected on a Buchner funnel, washed to neutrality with deionized water, the water pulled off from the solids to form a cake, and the cake crushed in an evaporating dish and dried in a convection oven at 50° C. for 18 hours.

Neutralization of BBC

Place 1 to 2 grams of the crushed reacidified cake, measured to the nearest 0.01 g., in a clean 32 oz. wide-mouth jar to provide the experimental sample. An equal amount of Avicell PH101 microcrystalline cellulose is put in a second clean 32 oz. wide-mouth jar to provide the control sample. To each sample jar is added 600 ml. of deionized water and 50 g. of reagent A, the closed jars rolled at room temperature for 24 hours, and the suspensions filtered into clean, dry 125 ml filter flasks.

Analysis for Barium (Ba)

The filtrate of each sample is analyzed for Ba by inductively coupled plasma-optical emission spectroscopy using a Perkin-Elmer ICP/5500 spectrometer.

Calculation of BBC

Wt. % of backbone carboxyl groups for each sample based on the sample weight is calculated from the equation $$BBC = (4.26 \times 10^{-2}) \frac{(Ba_c - Ba_x)}{S}$$

where
- $Ba_c$ is the concentration (ppm) of Ba in the control sample filtrate;
- $Ba_x$ is the concentration (ppm) of Ba in the experimental sample filtrate; and
- S is the sample weight in grams.

The following is an exemplary calculation wherein:

$Ba_c = 183$ ppm;
$Ba_x = 136$ ppm; and
$S = 2.00$ g.

$$BBC = (4.26 \times 10^{-2}) \frac{(183 - 136)}{2.00} = 1.00 \text{ wt. \%}$$

The minimum % of backbone carboxyl in a sample is calculated as $$\left[ \frac{BBC}{\dfrac{100 \times \text{Total COOH}}{\left(100 - W\alpha + \dfrac{W\alpha}{MW\alpha} - W\phi + \dfrac{W\phi}{MW\phi} - W\beta + \dfrac{W\beta}{MW\beta}\right)}} \right] \times 100\%$$

where:
BBC is the wt % of backbone carboxyl group as calculated above;
total COOH is the wt % COOH calculated from the acid number obtained by weak base titration;
$W_\alpha$ is the wt % acetyl;
$MW_\alpha$ is the molecular weight of the acetyl moiety = 43 g/mole of acetyl;
$W_\phi$ is the wt % propionyl;
$MW_\phi$ is the molecular weight of the propionyl moiety = 57 g/mole of propionyl;
$W_\beta$ is the wt % butyryl; and
$MW_\beta$ is the molecular weight of the butyryl moiety = 71 g/mole of butyryl.

Since the total COOH in this example is 1.9% (data given above) and the wt % BBC is 1.00, the minimum % of backbone carboxyl in the sample is equal to $$\frac{\dfrac{1.00 \times 100\%}{100 \times 1.9}}{\left[\left(100 - 11 + \dfrac{11}{43} - 0.2 + \dfrac{0.2}{57} - 33 + \dfrac{33}{71}\right)\right]} = 30\%$$

The conversion factor $4.26 \times 10^{-2}$ employed in the above calculation is derived as follows:

$$\frac{2 \times 45 \text{ g/mole (COOH)} \times 0.65 \, 1 \times 1000 \text{ ml}/1 \times 10^{-6} \text{(ppm)}^{-1} \times 100\%}{137.3 \text{ g/mole Ba}} = 4.26 \times 10^{-2}.$$

The peroxide $\text{-}(\text{O}\text{—}\text{O})\text{-}$ values or functionality of the preferred XAE can reside in the polymer at more than one possible location and in different chemical associations with the XAE rings and pendant groups. The essential aspect is that the peroxide values represent actual $\text{-}(\text{O}\text{—}\text{O})\text{-}$ functionality, that they be measurable as such by techniques known to the art, and that they be useful, for example, in the free-radical initiation of curable coatings into which the XAE is compounded.

A typical species of anhydroglucose unit residue in which —O—O— moieties are found, as evidenced by polarography has the structure

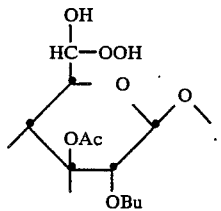

These peroxide groups in general in the XAE are considered quite stable by comparison, e.g., to t-butyl peroxypivalate, a commercially available free radical initiator which decomposes exothermically upon heat initiation. The present XAE, on the other hand, retains substantial peroxide functionality, even during the viscosity reduction stage of the present process. These moieties are formed during ozonolysis. This phenomenon does not occur in other reactions of cellulosics such as carboxylation thereof by esterification, as in making cellulose acetate phthalate, or by etherification, as in making carboxymethyl cellulose, and no useful peroxide values appear to result from those processes. For those cellulosics carboxylated by peroxide-initiated grafting, any peroxide introduced is apparently destroyed in the grafting process.

In the present invention, the molar ratio of total peroxide, $\text{-}(\text{O}\text{—}\text{O})\text{-}$, to total carboxylic acid, COOH, is approximately 2.2 for XAE in the acid number range from 5 to 50, prior to any post-ozonolytic processing. Treatment of XAE, other than storage at low temperature, may alter the peroxide level through decomposition thereof. The post-ozonolytic treatments of the present invention, however, will not take this ratio to less than 1 so that the finished XAE will have an equivalent ratio of peroxide to carboxylic acid of greater than 1 and less than or equal to approximately 2.2.

The peroxide values in meq. of $\text{-}(\text{O}\text{—}\text{O})\text{-}$ per gram of XAE are determined by reacting an excess of sodium iodide with the XAE sample in 1/1 by weight, acetic acid/methylene chloride for 30 minutes. Water is added and the liberated iodine is titrated with sodium thiosulfate to a starch end point. The equation for the calculation is $$\text{Peroxide Value} = \frac{(S - B) \times N}{W} \text{ wherein:}$$

$S$ = mL $Na_2S_2O_3$ used to titrate sample;
$B$ = mL $Na_2S_2O_3$ used to titrate blank;
$N$ = normality of the $Na_2S_2O_3$; and
$W$ = sample weight in grams.

The lactone moiety formation is unique to the present cellulose ester carboxylation and these moieties are contained in anhydroglucose residue units of the structures typified for example, by

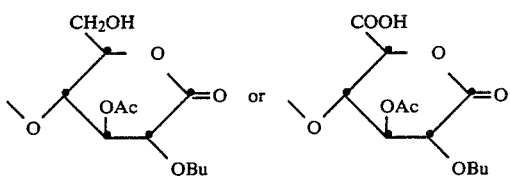

resulting from chain cleavage during ozonolysis and/or viscosity reduction. The lactone content is determined by subtracting the total carboxyl content of an XAE sample determined by weak base (Brinkmann) titration from the total carboxyl content of the same sample determined by strong base titration. The strong base opens the lactone by hydrolysis to give the —COO⁻ anion. The weak base titration is described in detail above. The strong base titration is as follows:

An XAE sample weighing from 0.25 g. to 0.60 g. measured to the nearest (0.005 g.) on a Mettler PC 4400 balance is added to 150 g.±1 g. of a solvent consisting of 90 wt. % methylene chloride and 10 wt. % methanol, and allowed to dissolve at room temperature with magnetic stirring. The solution is made 5±2 micromolar in phenolphthalein and titrated with an ethanolic KOH solution having a normality known to the nearest 0.001 N in the range of 0.1 N±0.01 N. The titration is performed by adding the titrant dropwise from a 25 ml. buret (Labglass, Inc.) to the solution being magnetically stirred at room temperature until a pink endpoint is obtained. The volume of titrant is measured to the nearest 0.05 ml. and the acid number AN is calculated from the equation $$AN = \frac{N \times ml \times 56.1 \text{ g/mole KOH}}{w}$$

where
  N = Normality of KOH,
  ml = ml of titrant, and
  w = wt. of XAE sample in grams.

A typical lactone level in moles of lactone moiety per gram of XAE is calculated as follows;
L≡moles of lactone moiety per gram of XAE, $$L = \frac{\Delta AN}{56100 \text{ mg/mole KOH}}, \text{ and}$$

wherein ΔAN=(AN by strong base titration)—(AN by weak base titration).

Example calculation
AN by strong base titration    22.1
AN by weak base titration      13.3

$$L = \frac{(22.1 - 13.3)}{56100} = 1.57 \times 10^{-4}$$

An important distinguishing characteristic of the present XAE material and one which contributes to its excellent automotive finish utility is its unusual reduction in solution viscosity with time as determined by the Hoeppler method defined below and given the designation herein of HVR, as previously mentioned. Typically, within the range of initial Hoeppler viscosity in centipoises (cps) of from about 20 to about 20,000 cps, a decrease in viscosity of the XAE solution in n-butylacetate/n-butyl alcohol, 85/15, wt/wt to 65-95% of the initial value normally occurs in about 24 hours at 80° C. This phenomenon is highly unusual since other cellulose esters experience little if any decrease in such viscosity, and usually show a slight increase with the passage of time. For the present XAE material in general, an initial Hoeppler viscosity of from about 10 to about 200 centipoises is preferred.

The Hoeppler viscosity method is based on the principle that viscosity may be measured by the time required for a standardized ball to roll down an inclined tube filled with the cellulose ester solution. The ball size is selected according to the initial viscosity to require sufficient time for it to pass between two reference marks for accuracy; not less than 20 nor more than 300 seconds. The larger the ball, the greater is the time required.

The Hoeppler Viscometer or Haake Falling-Ball Viscometer is distributed by several laboratory supply houses including PolyScience Corporation, 909 Pitner Ave., Evanston, Ill. It consists of a precision bore glass tube approximately ⅝ inches in internal diameter and 8½ inches in length with brass fittings and rubber gaskets on each end for stoppers, and a dropping funnel in the top. Reference marks are 10 cm apart in the mid-section. This tube is mounted in a glass water jacket approximately 3¼ inches in diameter and 7½ inches in length. The jacket is provided with a thermometer so placed that it may be read in the water, and is also provided with inlet and outlet fittings for circulating constant temperature water through the jacket and around the tube. The jacket and tube are mounted on a rigid frame fastened to a base provided with leveling screws and a leveling device so that when the base is level, the jacket and tube are inclined at exactly fifteen degrees.

The instrument is equipped with several standardized balls, some glass, some gold plated, and some steel. These balls vary in size and specific gravity and cover a wide range of viscosities, the glass balls having a low specific gravity and being used for very low viscosity liquids. The gold-plated balls and larger steel balls are for higher viscosity liquids, and the smaller steel balls for still higher viscosity liquids. Each ball has been accurately standardized with a constant "K" for the tube by the manufacturer. This constant and the factors in the following formula are used in the conversion of seconds to centipoises.

The Hoeppler viscosity N in centipoises (cps) is determined for the present XAE using a 20% by wt. solution of the XAE sample in a solvent consisting of an 85/15 weight ratio of n-butyl acetate/n-butyl alcohol, and is calculated from the equation $$N = T(S-D)K$$

wherein:
  T = time in seconds for the ball to pass between the reference marks in the sample;
  S = specific gravity of ball used;
  D = density of XAE sample solution at temperature of determination; and
  K = tube constant for the particular ball used.

The actual K value for the steel ball used in determining the Hoeppler viscosity of the XAE samples given below was determined using S-60 oil of known viscosity (101.1 cps). The ball had a weight of 16.238 g., a density of 8.146, and a micrometer measured diameter of 1.562 cm. The calculation of K according to the above equation was as follows:

$$N \quad T \quad S \quad D$$
$$101.1 = 185.6 \, (8.146 - 0.8638) \, K$$
$$K = 0.0748$$

Hoeppler Viscosity Determination

Two test samples of the same XAE material were prepared (20% solution by weight) by weighing 30.0 g±0.1 g of the XAE material and 120.0 g±0.1 g of the 85/15 (w/w) of n-butyl acetate/n-butyl alcohol solvent for each sample into a 8.0 oz, wide mouth, screw cap bottle. The bottles were then placed on a Burrell (Technical Supply Co.) Wrist Action Shaker using the high setting. Each sample was kept on the shaker for 45 min. and then placed in a constant temperature bath maintained at 25° C.±0.02° C. for 30 min. A density of 0.8912 for each of the 20% solution samples was determined using a standard type straight tube viscous liquid pycnometer. Each sample was then placed into the Hoeppler Viscometer and run immediately. The time, in seconds, was recorded and calculations made. The Hoeppler viscosity was calculated to be 39 centipoises (cps) for both samples.

In another aspect of the present invention there is provided a uniquely effective process for the preparation of the above described carboxylated cellulose ester material. In a most preferred embodiment of this process, cellulose ester starting material is provided in a special reaction system and is reacted therein under special conditions with ozone, and thereafter is specially treated in a closed loop system to reduce solution viscosity.

This novel and most preferred process, hereinafter referred to as the "dry" process, comprises contacting at from about 50° to about 75° C., cellulose ester material with ozone fed to a fluidized bed reactor for a sufficient period to carboxylate said material, converting said reactor to a closed loop system wherein the ozone feed is terminated, recirculating the gasses present in said system at from about 70° C. to about 95° C. and adding a volatile organic acid thereto in vapor form to a concentration of from about 0.2% to about 2.2% by weight of the initial ester material charge, continuing said recirculation until the Hoeppler viscosity of the carboxylated material is between 20 and 200 cps., and purging the system at elevated temperatures until the total free acid content is < about 0.5% by weight of said material charge.

In the viscosity reduction step which begins immediately after ozonolysis with no intervening processing, the bed no longer is fluidized with an ozone-containing gas stream but instead is fluidized with a recirculating gas stream (VR) comprised mainly of air or air diluted with an inert gas such that the oxygen concentration is less than about 21 wt. % thereof. Mechanical agitation of the bed during both ozonolysis and viscosity reduction for certain of the XAE material is desirable. The temperature of the bed, for the viscosity reduction, is raised to between about 75° C. and 95° C. depending on the acid number of the product being processed. The gas flow provided by the blower in the VR stream is 20 SCFM to 30 SCFM. A volatile organic acid, preferably acetic acid, is added to the VR stream by vaporizing the acid thereinto with a vaporizer. The total amount of volatile organic acid added is in the range from 0.2 wt. % to 2.2 wt. % of the carboxylated material depending on the acid number desired for the product. This step is continued until the XAE reaches a specified Hoeppler viscosity in the range from about 20 cps to about 200 cps depending on the desired acid number. After the target viscosity is reached, the volatile acids are stripped by discontinuing recirculation, venting the reactor, and fluidizing the bed with fresh air or fresh air diluted with an inert gas, again such that the oxygen concentration is in the range from 0 wt. % to 21 wt. %. The flow rate of the fresh gas into and out of the reactor ranges from 20 SCFM to 40 SCFM. After leaving the reactor, the gas stream is scrubbed to remove pollutants and then vented. The temperature of the bed may be maintained at the same temperature which was established for viscosity reduction. The stripping process is continued until the total level of the volatile organic acids such as formic, acetic, propionic or butyric is less than about 2000 ppm of the XAE by weight.

It is most preferred in the ozonolysis section of this process that (1) the water content of the starting cellulose ester be < about 4.0 wt. %, (2) the fluidizing stream contains from about 1.0 to about 3.0 wt. % ozone, (3) the temperature be from about 50° C. to about 75° C., and (4) the ozone contact time be from about 4 to about 10 hours. The low moisture content in the reactor bed and of the starting material is very important for the reproducible control of the ozonolysis and for obtaining optimum carboxylation rate. The fact that the reactor bed is fluidized instead of stationary aids in ensuring a uniform product and allows for more efficient utilization of the ozone. Conversely a stationary bed would not work satisfactorily for making the preferred XAE as evidenced by the fact that whenever fluidization of the bed is lost during ozonolysis, an intractable and unusable lump forms. It is particularly noted that in the viscosity reduction step the concentrated solution viscosity (Hoeppler) markedly reduces without any attendant and uncontrolled increase or decrease in carboxyl content. This phenomenon is very important to achieving reproducibility of product of predeterminable chemical composition and properties. The particular manner in which this step is carried out in the present process has several advantages over water digestion including higher yield, XAE is not lost in the water, drying is obviated, restabilization is obviated since typically used anti-hydrolysis agents, e.g., K-acid citrate is not washed out in the water digestion, less waste removal and all steps in the process are carried out in the same vessel which effects large capital savings.

A schematic of a preferred apparatus for carrying out the above process is shown in FIG. 1 and comprises a reactor vessel 10 surrounded by a water jacket 12 and provided with a stirrer 14, stirrer motor 16, valve controlled ester inlet 18, valve controlled product outlet 20, porous stainless steel felt-like material 22 forming the bottom of the reactor space, valve controlled vapor recirculation (VR) inlet 24 and outlet 26, VR blower 28, VR heater 30, VR vaporizer 32, gas stripper (GS) air supply 34, GS heater 36, GS inlet 38, GS outlet 40 and GS scrubber 42.

Example of the Production of XAE by the "Dry" Process

Referring to FIG. 1, 300 pounds of finely powered CAB are charged to the fluid-bed reactor. The bed is fluidized with air at a flow rate of 24 SCFM and the bed temperature is brought to 60° C. Ozonolysis is performed with a stream of air from 34 at 20° C. containing 2 wt % ozone. During ozonolysis, the bed is agitated with the mechanical agitator 14 at 30 rpm. The duration of ozonolysis is 11 hours. At the end of the reaction time, the fluidizing gas is changed from 2 wt % ozone in air to a closed loop, recirculating gas stream VR without added ozone. The recycle blower 28 recirculates the gas through the ester bed at 24 SCFM and the bed temperature is raised to 80° C. Acetic acid is vaporized from 32 into the VR stream until the total amount of acetic acid added thereto is 0.8 wt % of the ester charge. Throughout the fluidization, agitation is maintained at 30 rpm. The recirculation at 80° C. is continued until the Hoeppler viscosity of the material is less than 40 cps. At this point, the recycle blower 28 is shut down and a fresh air stream from 34 is passed through the fluidized bed at 80° C. and 30 SCFM and vented through scrubber 42. The fluidization with fresh air is continued until the total free acid content is less than about 0.2 wt % of the ester charge. The XAE product is then cooled to 30° C. by reducing both the fresh air temperature and the reactor temperature and then discharged from the reactor through valve 20 into drums.

In another aspect of the present invention there is provided a carboxylated cellulose ester which is prepared by the process of the present invention.

The present invention further provides a carboxylated cellulose ester having an acid number of at least about 5 and an inherent viscosity of about 0.01 to 1.00.

In another aspect of the present invention, there is provided a novel clear-on-base metal coating system. The coating system comprises a non-aqueous base film which comprises a first film-forming material comprising about 20 to 50% by weight of a carboxylated cellulose ester having an acid number of at least about 5 and an inherent viscosity of about 0.01 to 1.00, and correspondingly about 50 to 80% by weight of a film-forming resin comprising an alkyd resin, a melamine resin, a polyester resin, an acrylic resin, a urethane resin, or a mixture thereof. The base film further comprises uniformly dispersed pigments and volatile organic solvents. The coating system further comprises a transparent coating composition which is deposited on the base film without substantial intermixing or intersolution of the base film and the transparent coating composition. The transparent coating composition comprises a second film-forming material comprising an alkyd resin, a polyester resin, an acrylic resin, a urethane resin, or a mixture thereof, and volatile organic solvents for the second film-forming material. The second film-forming material of the transparent coating composition may further comprise a carboxylated cellulose ester.

In another aspect of the present invention, there is provided a metal coating which is the reaction product of approximately stoichiometric quantities of a first component consisting essentially of a reactive polyfunctional isocyanate material and a second component comprising
 (i) about 20 to 100% by weight of a carboxylated cellulose ester having an acid number of at least about 5 and an inherent viscosity of about 0.01 to 1.00, and
 (ii) correspondingly about 0 to 80% by weight of a thermosetting acrylic resin.

In another aspect of the present invention, there is provided a pigment dispersion comprising about 20 to 50% by weight of a pigment and correspondingly about 50 to 80% by weight of a carboxylated cellulose ester having an acid number of at least about 5 and an inherent viscosity of about 0.01 to 1.00.

In another aspect of the present invention, there is provided a urethane wood finish which comprises about 1 to 60% by weight of a carboxylated cellulose ester having an acid number of at least about 5 and an inherent viscosity of about 0.01 to 1.00; 0 to about 50% by weight of a urethane-forming polyol; and about 15 to 65% by weight of a urethane-forming polyfunctional isocyanate.

In another aspect of the present invention, there is provided a wood finishing modifying lacquer which is compatible with nitrocellulose-based furniture lacquers. The modifying lacquer comprises about 20 to 80% by weight of a carboxylated cellulose ester having an acid number of at least about 5 and an inherent viscosity of about 0.01 to 1.00, 0 to about 50% by weight of an alkyd resin, 0 to about 50% by weight of a maleic resin, 0 to about 30% by weight of a plasticizer, and a solvating quantity of a solvent comprising a lower alkyl ester of a lower carboxylic acid, a lower alkyl ketone, a hydrocarbon having about 5 to 12 carbon atoms, a lower aliphatic alcohol, or a mixture thereof. One or both of the alkyd resin and the maleic resin is present in a total concentration of at least about 10% by weight, and the total concentration of the alkyd resin and the plasticizer is at least about 20% by weight.

In another aspect of the present invention, there is provided a novel ink composition having improved color development and improved adhesion to plastic substrates. The ink composition comprises about 30 to 70% by weight of a carboxylated cellulose ester having an acid number of at least about 5 and an inherent viscosity of about 0.01 to 1.00, correspondingly about 30 to 70% by weight of an ink pigment, an ink solvent in a quantity sufficient to provide a viscosity which is suitable for applying the ink composition, and, optionally, up to about 15% by weight, based upon the total weight of the composition, of each of one or more modifiers comprising maleic resins, acrylic resins, sucrose ester resins, phthalate plasticizers, polyester resins, urea-formaldehyde resins, or mixtures thereof, provided that the total concentration of the modifiers in the composition does not exceed about 60% by weight.

DETAILED DESCRIPTION OF THE INVENTION

Figure 1:
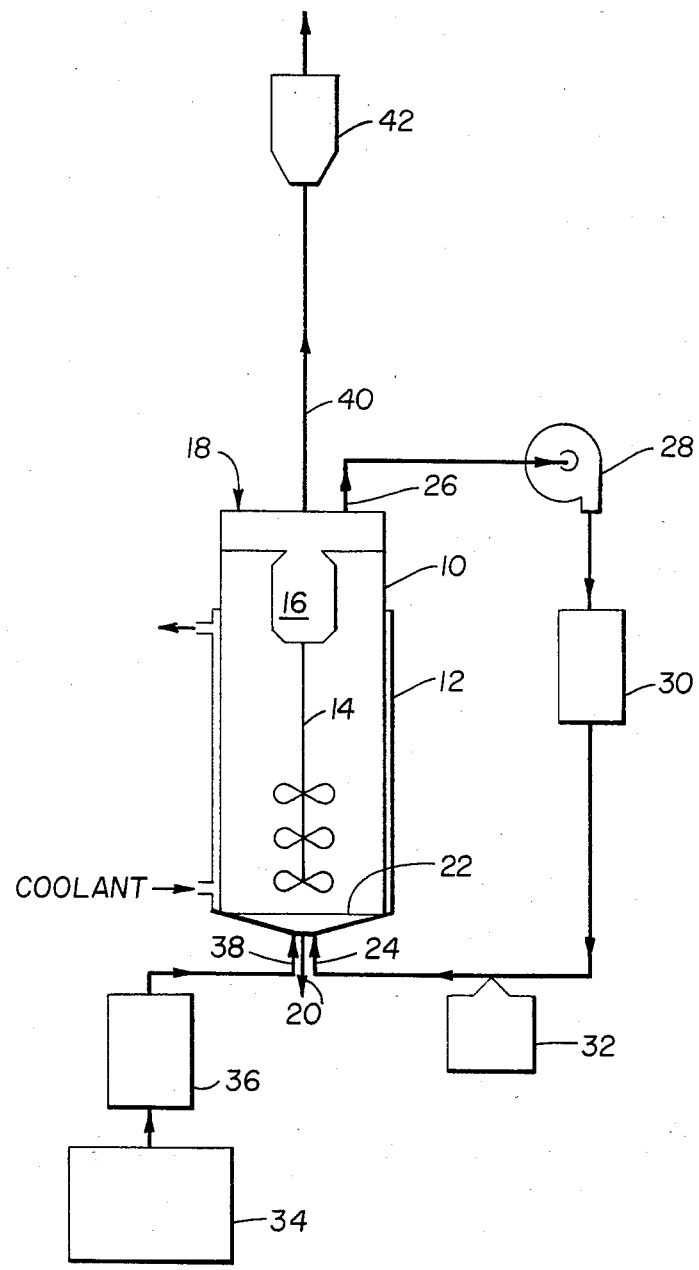

General Process for Preparing Carboxylated Cellulose Esters

In accordance with general technology for preparing the present XAE material, cellulose esters are reacted with ozone to yield the carboxylated cellulose ester product. The cellulose esters which are useful as starting materials in the present invention are well known, as also are methods for their production and the methods for analyzing for acetyl, butyryl, and propionyl content, for degree of polymerization (DP) and for viscosity determinations. See, for example, *Kirk-Othmer Encyclopedia of Chemical Technology*, 3rd Ed., Vol. 5, pages 118-143. Specific cellulose esters which are useful in the process of the present invention include cellulose acetate, cellulose propionate, cellulose butyrate, cellulose acetate butyrate, cellulose acetate propionate, mixtures thereof, etc. Especially preferred as a starting material in the process of the present invention is cellulose acetate butyrate.

The cellulose ester starting material is provided to a reaction zone in a form which is suitable for reaction with ozone. For instance, it is possible to provide the cellulose ester in the form of a solution in an appropriate solvent. The solvent for such a solution should be one in which both the cellulose ester starting material and the carboxylated cellulose ester product are soluble. The solvent also should be substantially unreactive with ozone. A wide variety of materials meets these criteria. Among the most inexpensive and readily available of the suitable solvents are the lower alkanoic acids and the lower alkyl ketones. A non-exclusive list of suitable solvents includes formic acid, acetic acid, acetone, methyl ethyl ketone, methyl propyl ketone, methyl isobutyl ketone, methyl amyl ketone, etc. Higher acids, such as propionic and butyric acids, are reactive with ozone, yielding lower acids. Because the ultimate lower acids are suitable solvents, these higher acids may also be employed as solvents in the present process, but are less preferred than the lower acids.

It is also contemplated that the cellulose ester starting material may be provided in the form of an aqueous slurry. However, reaction between ozone and cellulose ester may be somewhat more difficult to accomplish in such a system due to the low solubility of ozone in water.

The solvent and slurry systems described above offer the advantage of obviating the necessity of drying the cellulose ester starting material prior to reaction with ozone. However, following the reaction, the carboxylated product commonly is separated from the solvent or slurry system by evaporation, drying, etc. Therefore, the solution or slurry prior to reaction is preferably relatively concentrated in order to facilitate recovery of the product. However, the concentration of the slurry or solution is not critical and may be varied within wide limits, from very dilute to very concentrated, depending upon such factors as the nature of the solvent, the rate of agitation during the reaction, the degree of contact between the cellulose ester and the ozone, and other considerations which will be apparent to the person of ordinary skill in the art. Typically, however, a solids content of about 20 to 30% by weight is desirable, with a solids content of about 20 to 25% by weight being preferred.

Preferably, however, the cellulose ester starting material is provided in a solid particulate form. For example, the cellulose ester can be provided as pellets, granules, powders, or any other convenient particulate form. In preferred embodiments, the cellulose ester is provided in the form of a powder.

In those embodiments wherein a solid cellulose ester is employed, the cellulose ester starting materials preferably have a moisture content no greater than about 5.0% by weight. At higher moisture levels (e.g., greater than about 25% by weight), the cellulose ester particles tend to clump together and longer reaction times are necessary in order to obtain a desirable product. It is not necessary to expend effort or resources in order to achieve a moisture content less than about 15 weight percent, the efficiency of the oxidation reaction not being measurably affected thereby. However, fluidization of a cellulose ester powder (as discussed below) is most facile at moisture levels less than about 5% by weight (e.g., 2% or less).

In the reaction zone, the cellulose ester is intimately contacted with a gaseous stream comprising ozone. The ozone can be generated from a source of molecular oxygen or from air by the use of any commercial ozone generator. The intimate contacting can be accomplished by any means which provides relatively rapid, complete, and uniform reaction between the cellulose ester and the ozone. For example, it is contemplated that the cellulose ester be agitated in the reactor while a gaseous stream containing ozone is passed through the reactor. Alternatively, in those especially preferred embodiments wherein the cellulose ester is present in the form of a powder, it is desirable to pass the gaseous stream containing ozone through a distributor plate and through the cellulose ester powder so as to create a fluidized solid.

The gaseous stream which is passed through the cellulose ester preferably comprises at least about 0.25 weight percent ozone, based upon the total weight of gas present in the reaction system. Preferably, the ozone is present in a concentration of about 0.5 to 4 percent by weight (e.g., about 1 to 3%). Higher ozone concentrations (e.g., as high as 7% or higher) are of course, effective, but are increasingly uneconomical. The gaseous stream in addition to ozone further comprises air, oxygen, and/or inert diluent gas, such as nitrogen. In preferred embodiments, the gaseous stream comprises at least about 90% inert diluent (about 50% $N_2$ and about 40% from air) and about 1.5 to 2% ozone, the remainder comprising $O_2$, $CO_2$, and other components of air.

It will be apparent that there is an inverse relationship between ozone concentration and time of reaction, all other factors being constant. That is, as the concentration of ozone in the gas stream decreases, the time of reaction increases (ultimately, to uneconomically long periods of time).

It is believed that ozone partial pressure has an advantageous effect on rate of reaction. That is, as the partial pressure of ozone increases, the rate of reaction is believed to also increase. While the use of atmospheric pressure is preferred, it is conceivable that superatmospheric total pressures can also be employed. For a given ozone concentration, the partial pressure of ozone (and, therefore, the rate of reaction) is higher at superatmospheric pressures than at atmospheric pressure. Therefore, it may be possible to employ superatmospheric pressures and lower ozone concentrations to achieve a desired rate of reaction.

The cellulose ester is reacted with the ozone which is present in the gaseous stream. The reaction is conducted at a temperature of about 25°–80° C. (preferably, about 50°–75° C.). At reaction temperatures much above 75° C., the polymer particles may begin to stick together, thereby forming clumps, and the oxidation reaction is no longer homogeneous. Furthermore, the acids (such as acetic, propionic, and/or butyric) which are liberated during the ozone oxidation function as plasticizers for the cellulose ester starting material. The glass transition temperature of the reacting cellulosic material is thereby reduced, giving rise to additional polymer clumping problems at higher reaction temperatures.

The cellulose ester is reacted with the ozone for a period of time sufficient to yield a carboxylated cellulose ester product. Typically, desirable carboxylated cellulose ester products will have an acid number of at least about 5. Of course, the time of reaction required to obtain desirable products depends upon such factors as temperature, the concentration of ozone in the gas stream, etc. Commonly, desirable products are obtained by reacting the cellulose ester starting material with ozone for a period of time of at least about 0.5 hour. In preferred embodiments, the reaction is conducted for a period of time of about 0.5 to 24 hours (e.g., about 1 to 12 hours).

After the specified reaction time, the carboxylated cellulose ester product is removed from the reactor, separated from solvent (if employed), and purged free of the liberated aliphatic carboxylic acids by any convenient method. Commonly employed means include stripping the product under reduced pressure, heating the product in a forced-air oven, washing the product with water or mixtures of water with lower alkanols (such as methanol, ethanol, or i-propanol), etc. Alternatively, especially in embodiments wherein the reaction is conducted using solid particulate cellulose ester, the product can be purged of residual acid by-products in the reaction apparatus by passing a hot, inert purge gas (e.g., nitrogen) through the carboxylated cellulose ester product until it is free of residual acids.

Carboxylated Cellulose Ester Product

The carboxylated cellulose ester product is characterized principally on the basis of acid number, and related values, as determined by potentiometric titration. More specifically, the acid number for the carboxylated cellulose ester can be determined by automatic instrumental potentiometric titration using any standard commercial instrument. The automatic titrimeter will commonly employ a typical combination electrode of the silver/silver chloride type which responds to changes in hydrogen ion concentration. To determine the acid number of a carboxylated cellulose ester product, a sample of the product (typically, 0.7 to 1 g) is dissolved in dimethylsulfoxide solvent. This solution is then titrated with a known concentration (usually 0.05 to 0.2N; typically, 0.1N) of tetramethyleneguanidine in 2-propanol. From the number of equivalents of base required to accomplish the titration is calculated the acid number (i.e., the number of milligrams of potassium hydroxide which would have been consumed in the neutralization of 1 g of the product sample).

The carboxylated cellulose ester product typically exhibits an acid number of at least about 5 (e.g., about 5 to 50). Preferably, the acid number of the carboxylated cellulose ester is about 10 to 35. In especially preferred embodiments, the acid number of the carboxylated cellulose ester product is about 15 to 25.

The carboxylated cellulose ester product may be characterized further by determining the molecular weight of the product, e.g., by means of a suitable indirect method, such as inherent viscosity and/or concentrated solution viscosity. Preferably, the relative molecular weight of the product is determined by dissolving at 120° C. 0.5 g of the product in 100 ml of a mixture of phenol and tetrachloroethane having a phenol:tetrachloroethane weight ratio of 60:40 and then measuring the inherent viscosity of the solution at 25° C. The carboxylated cellulose ester product has an inherent viscosity when measured in this manner of about 0.01 to 1.00. Preferably, the inherent viscosity is about 0.05 to 0.5.

The carboxylated cellulose ester product is compatible with a number of solvents. These solvents include methanol; methylene chloride; diacetone alcohol; lower alkanoic acids, such as formic acid, acetic acid, propionic acid, etc.; lower alkyl ketones, such as acetone, methyl ethyl ketone, methyl propyl ketone, methyl isobutyl ketone, methyl amyl ketone, etc.; esters, such as ethyl acetate, isopropyl acetate, n-butyl acetate, isobutyl acetate, 2-butoxyethyl acetate, 1-methoxy-2-propyl acetate, 2-ethoxyethyl acetate, etc.; ethers such as 2-ethoxyethanol, 2-propoxyethanol, 2-butoxyethanol, etc.; and mixtures, such as mixtures of toluene and/or xylene with ethanol, mixtures of ethanol with esters (e.g., ethyl acetate, 1-methoxy-2-propyl acetate, etc.), or the like. Of course, the above listing is not intended to be exhaustive, but is indicative of the variety of solvents which may be employed in conjunction with the products of the present invention.

The carboxylated cellulose esters of this invention are compatible with a wide range of resinous materials. Classes of resins with which the carboxylated cellulose esters are compatible include, but are not limited to, thermoplastic acrylics, thermoset acrylics, silicone resins, alkyd resins, ordinary cellulose esters, urea formaldehyde resins, melamine resins, urethanes, nitrocellulose, unsaturated and other thermosetting polyester resins, etc.

While not wishing to be bound by theoretical considerations, it appears that the process of the present invention involves a chemical modification of a cellulose ester starting material which has not been hitherto described in the literature. This chemical modification gives rise to a product having unique properties, the product also not having been recognized heretofore in the art. While the reaction mechanism is as yet not completely understood, it appears that the reaction of a cellulose ester with ozone involves oxidation of a primary hydroxyl group (or, possibly, an ester group) at the $C_6$ position of the anhydroglucose ring. When cellulose acetate butyrate is employed as the starting material, a segment of the carboxylated product might appear as follows:

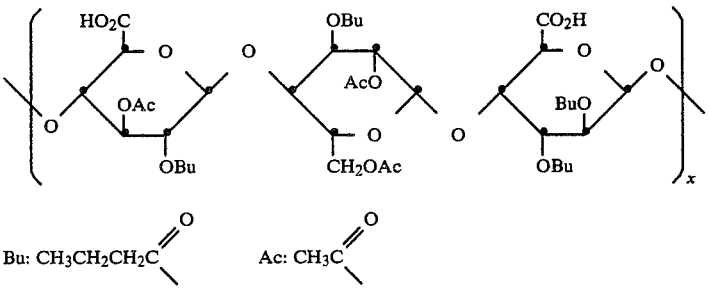

Oxidation

As the oxidation reaction proceeds, ester groups attached to the cellulose chain are cleaved, thereby yielding free acids as by-products. In addition, there is a chain cleavage reaction leading to the formation of a lactone, as illustrated below:

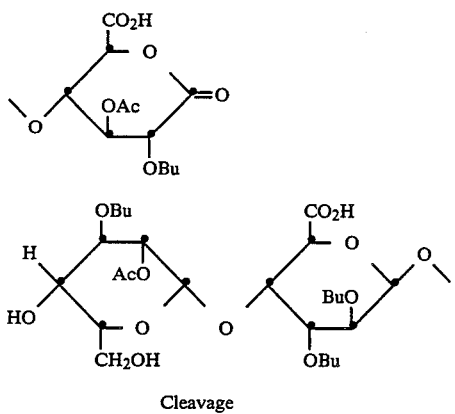

Cleavage

As illustrated by the above structural formulas, the carboxyl group of the product of the present invention is attached directly to the polymer backbone. In this manner, carboxyl groups which are retained on the polymer during hydrolysis are incorporated into the polymer.

The carboxylated cellulose esters provided by the present invention offer a number of advantages over existing cellulose ester products. The products of this invention are typically very low viscosity resins. These resins are compatible with a wide variety of solvents and other resins. Furthermore, the products contain free carboxyl groups, unaffected, of course, by hydrolysis conditions, yet which are available for reaction.

These unique properties of the products of the present invention indicate their usefulness in a number of applications, most notably in coatings compositions. It is contemplated that the products of this invention will find utility in automotive finishes, wood coatings, inks, lacquers, pigment dispersions, etc.

Pigment Dispersions

Cellulose esters have found utility in pigment dispersions. In one type of conventional dispersion, a cellulose ester, such as cellulose acetate butyrate, is blended with an organic or inorganic pigment, and the mixture is then processed in suitable apparatus, such as a two-roll mill. During processing, frictional heat and/or heat provided from an external source causes the cellulose ester to soften and subsequently disperse the pigment. In this manner, expensive pigments can be easily dispersed in coating formulations, thereby providing high coloring power and good transparency while using a minimal amount of the pigment.

Such pigment dispersions can be improved by the use of the product of this invention in place of the ordinary cellulose esters previously employed. It is believed that the carboxyl groups present in the product of this invention provide improved wetting properties to the pigment dispersion. In this manner, pigment dispersions which are superior to those previously known can readily be formulated. In particular, mixtures of carboxylated cellulose esters (e.g., carboxylated cellulose acetate butyrate) and pigments at pigment:carboxylated cellulose ester weight ratios of about 20:80 to 50:50 can be prepared. For example, such mixtures can be processed on a heated two-roll mill for about 5 to 30 minutes. It was found that, after this type of processing, pigments were more finely dispersed in the carboxylated cellulose acetate butyrate, for example, than similar pigments dispersed in ordinary cellulose acetate butyrate under similar conditions. These pigment dispersions can be used to pigment formulations useful for aerosol finishes, printing inks, industrial lacquers, automotive coatings, wood stains, textile coatings, and coatings for films and foils. The dispersions can also be used as colorants for plastics and adhesives.

Other methods of dispersing pigments (solution methods) such as by ball mill, pebble mill, Kady mill, sand mill, etc., also indicate that carboxylated cellulose esters, such as the acetate butyrate and acetate propionate esters, are more efficient pigment dispersing agents than ordinary cellulose esters. In these methods, the carboxylated cellulose ester is dissolved in a suitable solvent, pigment is added, and the mixture is mixed in a mill for up to 48 hours. The resulting solution dispersion can be used to pigment lacquers, inks, automotive coatings, etc.

Pigments which have been evaluated and have been found to be suitably dispersed in carboxylated cellulose esters include perylenes, quinacridones, phthalocyanines, iron oxides, and carbon blacks. The wide compatibility of carboxylated cellulose esters allows the use of dispersions of pigments in the carboxylated cellulose esters to be used with a wide variety of polymers, thus making the dispersions useful in many paint and ink formulations.

Metal Coatings

Cellulose esters have been used in multilayer coating compositions, such as clear-on-base coatings (i.e., wet-on-wet coatings) and other such coating systems for metal substrates. Typically, the cellulose ester is employed in such systems as an additive to control solvent release and/or viscosity. However, the typical cellulose esters give rise to undesirably high viscosities at high solids contents. Therefore, this type of coating composition ordinarily is limited to solids contents in the range of 10 to 14% by weight. This type of coating composition is described, e.g., in U.S. Pat. Nos. 3,639,147, 4,208,465, and 4,315,053.

These coating compositions can be improved by employing the product of the present invention in place of the previously employed ordinary cellulose esters. The use of the present product in such coating systems provides faster drying time (i.e., better solvent release) without a significant increase in the viscosity of the coating composition. Therefore, higher solids content on the order of 20 to 50% by weight (e.g., 25 to 40% by weight) can be obtained. This phenomenon is believed to be due to the reduced molecular weight of the carboxylated cellulose esters of the present invention and, perhaps, also to improved solvent compatibility due to the carboxyl groups positioned on the cellulose backbone of the present products.

In addition, the present products provide distinct advantages during curing of the coating composition over compositions which contain ordinary cellulose esters. For example, thermosetting automotive coatings for the original equipment market containing the carboxylated cellulose esters of the present invention can be cured (i.e., crosslinked) at temperatures as low as 120° C., or perhaps even lower. It is believed that these improvements are due to the presence of a greater number of active sites within the structure of the present product, the active sites being capable of crosslinking, thereby giving rise to harder coatings in polyester or acrylic coatings systems.

The novel clear-on-base metal coatings of the present invention comprise a non-aqueous base film and a transparent coating composition. The non-aqueous base film comprises a first film-forming material, uniformily dispersed pigments, and volatile organic solvents for the first film-forming material. The first film-forming material comprises about 20 to 50% by weight of a carboxylated cellulose ester and correspondingly about 50 to 80% by weight of a film-forming resin comprising an alkyd resin, a melamine resin, a polyester resin, an acrylic resin, a urethane resin, or a mixture thereof. In preferred embodiments, the carboxylated cellulose ester comprises carboxylated cellulose acetate butyrate. The film-forming resins mentioned above, suitable pigments, and suitable volatile organic solvents for the first film-forming material are all thoroughly described in the above-cited U.S. Pat. No. 3,639,147, the disclosure of which is herein incorporated by reference in its entirety. The non-aqueous base film may further comprise one or more additives for rheology control. A typical example of such a rheology control agent is aluminum stearate. Such an additive may be employed in an amount of about 1 to 5% by weight, based upon the total weight of nonvolatiles in the coating composition.

The transparent coating composition comprises a second film-forming material comprising an alkyd resin, a polyester resin, an acrylic resin, a urethane resin, or a mixture thereof, and volatile organic solvents for the second film-forming material. These components likewise are described in detail in the above-referenced U.S. Patent. The second film-forming material of the transparent coating composition may further comprise the carboxylated cellulose ester product of the present invention. In those embodiments wherein the transparent coating comprises a carboxylated cellulose ester, the carboxylated cellulose ester is typically present in an amount of about 10 to 30% by weight (e.g., about 10 to 20% by weight), based upon the total weight of the second film-forming material. The inclusion of the carboxylated cellulose ester in the transparent top coat has been found to improve the rheology of the top coat, allowing the application of thicker coatings per pass.

The transparent coating composition is deposited on the base film so as to minimize intermixing or intersolution of the base film and the transparent coating composition. The propensity of the transparent coating composition and the base film of the coating system of the present invention to intermix during application of the transparent coating composition is much less than that of prior art clear-on-base metal coating compositions. In other words, the metal coating system of the present invention provides greatly improved resistance to redissolving of the base film upon application of the transparent coating composition. This feature, in conjunction with the lower viscosity of the composition at a higher solids content than prior art compositions, allows for more rapid application of the coating system of the present invention. These advantages have great commercial appeal by providing for improvements in productivity and economy of operation.

In addition, the metal coating system of the present invention provides improvements in the aesthetics of the final coating. The coating system of the present invention provides better orientation of pigment flakes (e.g., aluminum flakes), thereby giving rise to improvements in clarity and depth in the appearance of the coating. These improvements are clearly demonstrated by Example 56 and Comparative Examples 10-15 which are provided below.

The carboxylated cellulose esters of the present invention are also useful in the formulation of urethane-type metal coatings. Such compositions are especially useful in the automotive refinish market. Such a coating is the reaction product of approximately stoichiometric quantities of a first component consisting essentially of a reactive polyfunctional isocyanate material and a second component. The second component comprises about 20 to 100% by weight of a carboxylated cellulose ester and correspondingly about 0 to 80% by weight of a thermosetting acrylic resin. In preferred embodiments, the second component of the urethane-type metal coating contains about 50% by weight of the carboxylated cellulose ester.

Suitable reactive polyfunctional isocyanate materials which can be employed as the first component are well-known in the art and are described, for example, in the *Kirk-Othmer Encyclopedia of Chemical Technology*, second edition, Vol. 12, pages 45-63. This disclosure is incorporated herein by reference in its entirety. The thermosetting acrylic resins which can be employed in the second component of the novel urethane-type metal coating are well known in the art; selection of a suitable resin will be readily apparent to the person of ordinary skill in the art. The carboxylated cellulose ester which is employed in the second component of the novel urethane-type metal coating of the present invention in preferred embodiments comprises carboxylated cellulose acetate butyrate.

The novel urethane-type metal coating of the present invention may optionally include a minor amount of one or more additives as needed or desired. Such additives can include, for example, flow control agents (e.g., silicones or the like), surface active agents (for improved leveling properties), UV absorbents (e.g., hindered amines, such as Tinuvin ® 900 or 292), etc.

The urethane-type metal coatings of the present invention provide distinct improvements over similar prior art compositions. In particular, the coating compositions of the present invention provide rapid drying properties which, as with the clear-on-base coatings described above, give rise to improvements in productivity and economy of operation.

Ink Compositions

Carboxylated cellulose esters are also useful in ink formulations. When a carboxylated cellulose ester is employed in an ink formulation, it can function as a medium to disperse the pigments for the ink, as discussed above, and it can also serve as a major film-forming resin. Ink formulations useful for printing by flexography, rotogravure, and screen processes can be based on carboxylated cellulose esters. Typical formulations can be prepared by employing carboxylated cellulose acetate butyrate, carboxylated cellulose acetate propionate, etc., rather than the ordinary cellulose acetate propionate or cellulose acetate butyrate employed in various ink formulations. Typical prior art formulations employing conventional cellulose esters are described, for example, in the publication "Cellulose Acetate Propionate Inks for Flexible Substrates" (Formulator's Notes No. E-4.1C), which is available from Eastman Chemical Products, Inc., Kingsport, Tenn.

Inks made from the carboxylated cellulose esters of the present invention have better gloss and color development due to the pigment dispersion ability of the carboxylated cellulose ester than similar inks based on ordinary cellulose esters. In addition, the carboxylated cellulose ester inks exhibit much better adhesion to foil and to corona-discharge treated polyolefin plastic film (e.g., polyethylene, polypropylene, etc.), vinylidene chloride, thermoplastic polyesters, etc., than do inks based upon ordinary cellulose esters.

The novel ink compositions of the present invention comprise about 30 to 70% by weight of a carboxylated cellulose ester. In preferred embodiments, the carboxylated cellulose ester comprises carboxylated cellulose acetate propionate, carboxylated cellulose acetate butyrate, or a mixture thereof. Preferably, the ink composition comprises about 45 to 70% by weight of the carboxylated cellulose ester.

The novel ink composition further comprises about 30 to 70% by weight of an ink pigment. Of course, the concentration of the pigment will depend upon the particular pigment employed and the color and degree of hiding desired in the ink composition. For example, inorganic pigments, such as titanium dioxide, will typically be employed in greater concentrations than most organic pigments. Pigments which are useful in the ink compositions of the present invention are those which are well known in the art. Such pigments are described, for example, in the *Kirk-Othmer Encyclopedia of Chemical Technology*, second edition, Vol. 11, pages 613–615. This disclosure is incorporated herein by reference in its entirety.

The ink composition of the present invention further comprises a solvent. The solvent is employed in a quantity which is sufficient to provide a viscosity which is suitable for applying the ink composition under the desired conditions. Again, the solvents for the ink compositions of the present invention are well known in the art and are described, for example, in the *Kirk-Othmer Encyclopedia of Chemical Technology*, second edition, Vol. 11, pages 621–623. Preferred solvents include ethanol, ethyl acetate, isopropanol, diacetone alcohol, ethylene glycol monoethyl ether, ethylene glycol monobutyl ether, and mixtures thereof.

The ink compositions of the present invention may optionally contain one or more modifiers, such as maleic resins, acrylic resins, sucrose ester resins, (e.g., sucrose acetate isobutyrate), phthalate plasticizers (e.g., dioctyl phthalate, dioctyl terephthalate, dibutyl phthalate, mixtures thereof, etc.), polyester resins, urea formaldehyde resins, melamine resins, mixtures of the above, etc. Each of these modifiers typically is employed in an amount less than about 15% by weight of the total ink composition. The total concentration of all of the above modifiers in the ink composition preferably is less than about 60% by weight. When a reactive resin, such as a maleic resin, acrylic resin, urea-formaldehyde resin, melamine resin, etc., is employed in the ink composition, an acid catalyst commonly is employed. Examples of such a catalyst include, for example, para-toluenesulfonic acid, phenyl acid phosphate, methanesulfonic acid, hydrochloric acid, etc. The usual catalyst concentration typically is about 1.5 to 3% by weight based upon the weight of the reactive resin solids.

The maleic resins which are employed in this and other aspects of the present invention are well known in the art. These resins typically are prepared by reacting rosin with maleic anhydride and/or a hydroxyl-containing compound, such as an alcohol, a glycol, glycerine, etc. The acrylic resins, polyester resins, urea-formaldehyde resins, etc., also are well known in the art, are available commercially, and need no further description here.

Wood Coatings

In wood coatings, carboxylated cellulose esters exhibit usefulness as major film-forming components in both curing and non-curing finishes. As an example of the curing type of wood finishes can be mentioned melamine/urea-formaldehyde/alkyd modified varnishes, which are well known in the art. In such a coating system, the carboxylated cellulose ester can be substituted for the ordinary cellulose ester commonly employed. For example, a typical formulation might comprise in the region of 10 weight percent of a carboxylated cellulose ester, such as carboxylated cellulose acetate butyrate, an alkyd resin (for example, in the range of about 20% by weight), a melamine resin, such as Cymel ® 303 (typically about 2 to 5% by weight), a urea formaldehyde resin, such as Beetle ® 80 (about 5 to 7.5% by weight), a relatively small amount of a silicone resin, such as SF 69, and a solvent system comprising suitable solvents such as xylene, toluene, ethanol, n-butyl alcohol, methyl ethyl ketone, etc. Flatting agents, such as Syloid ® 83, Syloid ® 378 and OK 412, are also commonly employed. Para-toluenesulfonic acid is also included in the coating composition as a catalyst.

Carboxylated cellulose esters can also be employed, rather than ordinary cellulose esters, in urethane finishes for furniture. For example, carboxylated cellulose acetate butyrate could be employed in various formulations similar to those described in the publication "Formulating Cellulose Acetate Butyrate/Urethane Finishes for Furniture" (Formulator's Notes No. E-3.6.1A), which is available from Eastman Chemical Products, Inc.

In particular, urethane wood finishes in accordance with the present invention comprise about 1–60% by weight, based upon the total weight of film-forming components, of a carboxylated cellulose ester, 0 to about 50% by weight (same basis) of a urethane-forming polyol, and about 15 to 65% by weight (same basis) of a urethane-forming polyfunctional isocyanate. In preferred embodiments, the carboxylated cellulose ester comprises carboxylated cellulose acetate butyrate.

Typically, the theoretical NCO:OH ratio of the composition exceeds 1:1; that is, it is desirable to have an excess of isocyanate functionality (NCO) over hydroxyl functionality (OH). Optimum NCO:OH ratios may range as high as 3:1 or more. The person skilled in the art will be able readily to determine optimum NCO:OH ratios based upon properties of the final coating.

As mentioned above with regard to the discussion of the metal coatings provided by the present invention, urethane-forming polyfunctional isocyanates are well known in the art. Likewise, urethane-forming polyols are also well known in the art and are described, for example, in the *Kirk-Othmer Encyclopedia of Chemical Technology*, second edition, Vol. 21, pages 60–63. This disclosure is incorporated herein by reference in its entirety. Urethane-forming polyols include polyether polyols, polyester polyols, polyhydroxy oils (e.g., castor oil), glycerides, etc.

In preferred embodiments of the urethane wood finishes of the present invention, the carboxylated cellulose ester is present in an amount of about 40 to 55% by weight, the urethane-forming polyol is present in an amount of about 2 to 10% by weight, and the urethane-forming polyfunctional isocyanate is present in an amount of about 35 to 60% by weight.

The urethane wood finishes of the present invention preferably further comprise a solvent, or a mixture of solvents, which is substantially free of reactive hydroxyl groups. Such solvents typically will comprise ester and ketone solvents, which readily dissolve the carboxylated cellulose ester. Suitable solvents include methyl ethyl ketone, methyl n-amyl ketone, methyl butyl ketone, isobutyl acetate, aliphatic hydrocarbons, aromatic hydrocarbons (e.g., xylene, toluene, etc.), and other well known, suitable solvents.

The urethane wood finish of the present invention may further comprise a suitable catalyst. Typical catalysts include compounds of tin or zinc, such as dibutyl tin dilaurate. Such catalysts are employed in an amount which is sufficient to catalyze the rate of cure without unreasonably diminishing the sprayable pot life of the composition. Catalytic amounts of suitable catalysts which fulfill these conditions will be readily apparent to the person of ordinary skill in the art.

In each of the wood coating systems described above, the carboxylated cellulose ester allows the formulation of a coating composition which can be applied at higher solids content than a composition based upon the ordinary cellulose ester counterpart. Thus, there is produced a coating having more depth, higher gloss, and a smoother appearance. In addition, the finishes employing the carboxylated cellulose ester are more resistant to attack by solvents, stains, and other chemicals and are tougher than finishes prepared from ordinary cellulose esters.

In non-curing finishes for wood (i.e., lacquers), the carboxylated cellulose esters can likewise be substituted for ordinary cellulose esters. Such a substitution can readily be made, for example, in the coating composition described in the publication "Light-Stable Cellulose Acetate Butyrate Wood Finishing Coating" (Publication No. E-240), which is available from Eastman Chemical Products, Inc., Kingsport, Tenn. The coating composition described therein is a typical acrylic lacquer for furniture.

Furthermore, the carboxylated cellulose ester product of the present invention can be formulated into an alkyd modified lacquer. Such a system can ordinarily not be prepared from conventional organic esters of cellulose due to the incompatibility of these conventional organic cellulose esters with alkyds. The furniture lacquers based on carboxylated cellulose esters modified with an alkyd are fully compatible with most nitrocellulose-based furniture lacquers, a distinguishing feature not shared by lacquers based on conventional organic cellulose esters. The wood finishing modifying lacquer of the present invention comprises a carboxylated cellulose ester, an alkyd resin, a maleic resin, and/or a plasticizer, as well as a solvent for the film-forming components.

The carboxylated cellulose ester is employed in an amount of about 20 to 80% by weight based upon the total weight of the film-forming components (i.e., the carboxylated cellulose ester, the alkyd resin, the maleic resin, and/or the plasticizer). The carboxylated cellulose ester preferably comprises carboxylated cellulose acetate butyrate.

The alkyd resin is employed in an amount of about 0 to 50% by weight, based upon the total weight of the film-forming components. Any of the alkyd resins which are well known in the art and are available commercially can be employed herein.

The maleic resin, if employed, is employed in an amount up to about 50% by weight, based upon the total weight of the film-forming components. Suitable maleic resins have been described generally above and are available commercially.

In the modifying lacquers of the present invention, the alkyd resin, if employed, provides flexibility and toughness to the final coating. The maleic resin, if employed, provides a harder, but more brittle, final coating. Therefore, at relatively high concentrations of the maleic resin in the modifying lacquer, it often is useful to incorporate a plasticizer, commonly in addition to an alkyd resin. Thus, for example, in a composition employing approximately 50% by weight of a maleic resin, there would commonly be present approximately 20% by weight of an alkyd resin and/or plasticizer and about 30% by weight of the carboxylated cellulose ester.

Thus, as suggested above, the composition may further comprise up to about 30% by weight, based upon the total weight of the film-forming components, of a plasticizer. Suitable plasticizers include phthalates, trimellitates, and other commonly employed plasticizers. Such plasticizers are well known in the art and include such compounds as dioctyl phthalate, dioctyl terephthalate, dibutyl phthalate, mixed trimellitate esters, etc. In preferred embodiments, the plasticizer comprises a phthalate ester, such as dioctyl phthalate.

In view of the distinct properties attributable to the inclusion of the various components in the modifying lacquer composition, it is necessary that one or both of the maleic resin and the alkyd resin be present in a total concentration of at least about 10% by weight so as to provide a certain degree of sturdiness to the final coating. It is further necessary that the total concentration of the alkyd resin and/or the phthalate plasticizer be present in the composition in an amount of at least about 20% by weight based upon the total weight of the film-forming components, so as to provide sufficient flexibility to the composition.

The modifying lacquer of the present invention further comprises a solvating quantity of a suitable solvent. Such solvents include lower alkyl esters of lower carboxylic acids, lower alkyl ketones, hydrocarbons having about 5 to 12 carbon atoms, lower aliphatic alcohols, mixtures thereof, etc. The term "lower alkyl" as used herein denotes alkyl groups having up to about 8 carbon atoms. Suitable hydrocarbon solvents include aliphatic hydrocarbons, such as the alkanes, and aromatic hydrocarbons, such as toluene, xylene, etc. Thus, suitable solvents include methyl acetate, ethyl acetate, isobutyl acetate, methyl propionate, ethyl propionate, methyl ethyl ketone, methyl n-butyl ketone, methyl isobutyl ketone, methyl n-amyl ketone, n-pentane, n-hexane, cyclohexane, the isomeric octanes, toluene, xylene, ethanol, isopropanol, isobutanol, n-butanol, etc.

A typical alkyd-modified carboxylated cellulose ester furniture finishing lacquer might comprise, for example, about 20 weight percent of carboxylated cellulose acetate butyrate; about 7.5 to 8% by weight of a coconut oil modified alkyd (60% in xylene); about 1.5 to 2% by weight of a dioctyl phthalate plasticizer; about 7 to 8% by weight of isopropyl alcohol; about 3.5 to 4% by weight of isobutyl alcohol; about 14 to 14.5% by weight of xylene; about 40 to 45% by weight of methyl isobutyl ketone; and about 3 to 3.5% by weight of methyl amyl ketone. Of course, the person of ordinary skill in the art will be able to formulate similar desirable coating compositions without undue experimentation.

This invention will be further illustrated by the following Examples although it will be understood that these Examples are included merely for purposes of illustration and are not intended to limit the scope of the invention.

EXAMPLES 1-6 and COMPARATIVE EXAMPLES 1 and 2

Cellulose acetate butyrate powder was placed in a glass vessel fitted at the bottom with a porous glass frit. The powder was then treated with oxygen which contained ozone. The gas stream was regulated so that the amount of ozone contacting the cellulose ester was controlled at a concentration of $1.4 \times 10^{-3}$ mole per minute. The reaction temperature was maintained at 60° to 70° C. After the respective specified reaction times, the oxidized product was isolated and placed in a circulating air oven at 70° C. for 24 hours in order to remove residual by-product acids. The products were characterized by determining the acid number and inherent viscosity by the procedures described above. The results are given below in Table I.

TABLE I

| Ex. No. | Reaction Time (Hrs.) | Acid No. | I.V. |
|---|---|---|---|
| 1 | 0.5 | 4.7 | 0.46 |
| 2 | 0.75 | 6.6 | 0.37 |
| 3 | 1.0 | 8.9 | 0.27 |
| 4 | 2.67 | 19.0 | 0.15 |
| 5 | 3.0 | 24.9 | 0.12 |
| 6 | 5.0 | 45.8 | 0.08 |
| Comp. Ex. 1 | 0 | 0.8 | 1.45 |
| Comp. Ex. 2 | 5.0 | ~0 | 1.43 |

The data of Table I demonstrate that reaction times as short as 0.5 hour may be effective in the production of carboxylated cellulose esters, but that reaction times of 1 to 5 hours are preferred. The data further show that longer reaction times lead to increased acid number for the product. Also, the inherent viscosity of the product generally decreases with longer reaction times.

Each of these Examples demonstrates a marked increase in acid number and decrease in inherent viscosity as compared to the results of Comparative Examples 1 and 2. Comparative Example 1 gives data for a control sample of cellulose acetate butyrate, while Comparative Example 2 shows the results of contacting the starting material with $O_2$ rather than ozone. It is readily apparent that there was virtually no change in the material.

EXAMPLES 7-18

Examples 7-18 were conducted in the manner described above except that the moisture content of the cellulose acetate butyrate powder was varied between 1 and 50%. The results are given below in Table II.

TABLE II

| Ex. No. | Moisture Content of Ester (Wt. %) | Reaction Time (Hrs.) | Acid No. | I.V. | Ozone Conc. (moles/min.) |
|---|---|---|---|---|---|
| 7 | 50 | 2.0 | 17.5 | 0.34 | $2.2 \times 10^{-3}$ |
| 8 | 50 | 4.5 | 39.6 | 0.23 | $2.2 \times 10^{-3}$ |
| 9 | 50 | 7.0 | 42.2 | 0.16 | $2.2 \times 10^{-3}$ |
| 10 | 25 | 1.0 | 7.7 | 0.51 | $2.2 \times 10^{-3}$ |
| 11 | 25 | 3.0 | 19.6 | 0.24 | $1.4 \times 10^{-3}$ |
| 12 | 25 | 3.0 | 21.1 | 0.21 | $1.4 \times 10^{-3}$ |
| 13 | 15 | 3.0 | 23.3 | 0.16 | $1.4 \times 10^{-3}$ |
| 14 | 15 | 5.0 | 40.6 | 0.13 | $1.4 \times 10^{-3}$ |
| 15 | 12 | 5.0 | 42.0 | 0.12 | $1.4 \times 10^{-3}$ |
| 16 | 1 | 0.9 | 9.3 | 0.28 | $1.4 \times 10^{-3}$ |
| 17 | 1 | 3.0 | 24.3 | 0.16 | $1.4 \times 10^{-3}$ |
| 18 | 1 | 5.0 | 42.5 | 0.11 | $1.4 \times 10^{-3}$ |

The data in Table II indicate that moisture content of the ester, if 15 weight percent or less, does not significantly affect the ozone oxidation reaction. However, if the moisture content is greater than about 15 weight percent, then higher ozone concentrations and/or longer reaction times are normally required to achieve a desired level of oxidation. The data of Table II also again demonstrate that acid number increases with increasing reaction time and I.V. decreases with increasing reaction time, all other variables being constant.

EXAMPLES 19-27 and COMPARATIVE EXAMPLE 3

Cellulose acetate propionate powder was subjected to oxidation with ozone as described above. The results are given below in Table III.

TABLE III

| Ex. No. | Reaction Time (Hrs.) | Acid No. | I.V. | Ozone Conc. (moles/min.) |
|---|---|---|---|---|
| Comp. Ex. 3 | 0 | 0.6 | 1.42 | 0 |
| 19 | 0.5 | 5.9 | 0.40 | $1.4 \times 10^{-3}$ |
| 20 | 0.5 | 10.1 | 0.43 | $1.4 \times 10^{-3}$ |
| 21 | 1.0 | 14.6 | 0.34 | $5.6 \times 10^{-4}$ |
| 22 | 1.0 | 14.0 | 0.25 | $1.4 \times 10^{-3}$ |
| 23 | 1.0 | 19.9 | 0.25 | $1.1 \times 10^{-3}$ |
| 24 | 1.0 | 13.9 | 0.23 | $2.2 \times 10^{-3}$ |
| 25 | 3.0 | 35.1 | 0.11 | $2.2 \times 10^{-3}$ |
| 26 | 5.0 | 41.1 | 0.08 | $2.2 \times 10^{-3}$ |
| 27 | 6.0 | 48.1 | 0.07 | $1.4 \times 10^{-3}$ |

The data of Table III demonstrate that cellulose acetate propionate undergoes the desired oxidation reaction when treated with ozone, giving the desired carboxylated cellulose acetate propionate. The data also show that the progress of the reaction is affected by variations in reaction time and/or ozone concentration.

EXAMPLES 28-31 and COMPARATIVE EXAMPLE 4

Cellulose acetate was oxidized with ozone according to the procedure described above. In each case, the ozone concentration was $1.4 \times 10^{-3}$ moles per minute. The results are given in Table IV below.

TABLE IV

| Ex. No. | Reaction Time (Hrs.) | Acid No. | I.V. |
|---|---|---|---|
| Comp. Ex. 4 | 0 | 0.2 | 1.28 |
| 28 | 1.0 | 15.6 | 0.21 |
| 29 | 3.0 | 37.4 | 0.09 |
| 30 | 5.0 | 50.9 | 0.09 |

TABLE IV-continued

| Ex. No. | Reaction Time (Hrs.) | Acid No. | I.V. |
|---|---|---|---|
| 31 | 6.0 | 68.2 | 0.07 |

The data of Table IV demonstrate that cellulose acetate undergoes oxidation by ozone to yield the desired carboxylated cellulose acetate product.

EXAMPLES 32–34 and COMPARATIVE EXAMPLES 5–7

In Comparative Examples 5 and 6 and Examples 32 and 33, the starting material was cellulose acetate butyrate. In Example 32, the starting material was oxidized with ozone at a concentration of $1.4 \times 10^{-3}$ moles per minute for a reaction time of 2 hours as described above. In Example 33, the starting material was oxidized with ozone at $1.4 \times 10^{-3}$ moles per minute for a reaction time of 5 hours, as described above. In Comparative Example 5, the starting material was subjected to a stream of oxygen under the conditions described above for a period of time of 5 hours. In Comparative Example 6, the starting material was subjected under the conditions described above to oxygen gas which had been treated with UV irradiation at 2537 Å through a quartz window.

In Comparative Example 7 and Example 34, the starting material was cellulose acetate propionate. In Comparative Example 7, the starting material was subjected to an oxygen gas stream which had been treated with UV irradiation through a quartz window, while in Example 34, the starting material was subjected to a gas stream containing $1.4 \times 10^{-3}$ moles of ozone per minute. The results are given in Table V below.

TABLE V

| Ex. No. | Reaction Time (Hrs.) | Acid No. | I.V. |
|---|---|---|---|
| Comp. Ex. 5 | 5.0 | <1 | 1.43 |
| Comp. Ex. 6 | 5.0 | <1 | 1.43 |
| 32 | 2.0 | 15.0 | 0.19 |
| 33 | 5.0 | 43.3 | 0.08 |
| Comp. Ex. 7 | 5.0 | <1 | 1.34 |
| 34 | 5.0 | 40.0 | 0.08 |

The results of Table V indicate that neither molecular oxygen nor UV-activated oxygen is a satisfactory substitute for ozone in the process of the present invention. Only the use of ozone provides the desired carboxylated cellulose ester having an increased acid number and a reduced inherent viscosity.

EXAMPLES 35–49

Cellulose acetate butyrate powder was placed in a stainless steel reactor 30 inches high and 6 inches in diameter. The vessel was jacketed to maintain the reaction temperature at 65° C. The reactor was charged with 1800 grams (2250 grams in Example 41) of the cellulose acetate butyrate starting material. A source of dry air was used to generate ozone under an electrical current of 3.5 amps. The ozone/air stream was further diluted with dry nitrogen just before it entered the reaction vessel. The gas stream comprised 23.83 grams per hour of ozone, 20 SCF per hour of air (30 SCF per hour in Example 41), and 20 SCF per hour of nitrogen (30 SCF per hour in Example 41). The cellulose ester starting material was fluidized by the gaseous stream and subjected to reaction conditions for the time indicated. The results are given in Table VI.

TABLE VI

| Ex. No. | Yield (grams) | Acid No. | I.V. | Reaction Time (Hrs.) |
|---|---|---|---|---|
| 35 | 1736 | 5.02 | .665 | 0.67 |
| 36 | 1721 | 5.67 | .540 | 1 |
| 37 | 1719 | 8.83 | .319 | 2 |
| 38 | 1725 | 9.57 | .298 | 2.5 |
| 39 | 1741 | 11.48 | .277 | 3 |
| 40 | 1751 | 14.38 | .223 | 3.5 |
| 41 | 2184 | 14.25 | .202 | 4 |
| 42 | 1749 | 15.20 | .222 | 4 |
| 43 | 1704 | 19.56 | .182 | 5 |
| 44 | 1737 | 19.17 | .165 | 6 |
| 45 | 1710 | 27.05 | .127 | 7.75 |
| 46 | 1736 | 26.78 | .132 | 8 |
| 47 | 1749 | 27.60 | .124 | 8.5 |
| 48 | 1757 | 38.75 | .099 | 10 |
| 49 | 1692 | 35.6 | .125 | 10.25 |

The data of Table VI show that air is an acceptable low cost raw material for producing carboxylated cellulose esters in large quantities.

EXAMPLES 50–55

The procedure described above for Examples 35–49 was repeated except that cellulose acetate propionate was employed as the starting material. The results are given below in Table VII.

TABLE VII

| Ex. No. | Yield (grams) | Acid No. | I.V. | Reaction Time (Hrs.) |
|---|---|---|---|---|
| 50 | 1718 | 4.99 | .669 | 0.5 |
| 51 | 1725 | 5.61 | .598 | 0.75 |
| 52 | 1735 | 12.84 | .213 | 3 |
| 53 | 1783 | 15.61 | .185 | 3.5 |
| 54 | 1799 | 40.18 | .090 | 10 |
| 55 | 1815 | 43.72 | .073 | 12 |

Again, the data demonstrate that carboxylated cellulose esters can be produced in large quantities using air as the source of ozone.

COMPARATIVE EXAMPLE 8

The apparatus described in Example 1 was charged with microcrystalline cellulose (Avicel PH 101) and was treated with ozone for 5 hours at 60° to 70° C. The microcrystalline cellulose was recovered substantially unchanged.

COMPARATIVE EXAMPLE 9

The apparatus described in Example 1 was charged with cellulose wood pulp ground to 100 mesh, which was treated with ozone for 5 hours at 60° to 70° C. Again, the cellulose was recovered substantially unchanged. These Comparative Examples demonstrate that cellulose (as opposed to a cellulose ester) is not suitable as a starting material in the process of the present invention.

EXAMPLE 56

This Example illustrates the use of a carboxylated cellulose acetate butyrate in a clear-on-base metal coating composition. The carboxylated cellulose acetate butyrate was produced by the process of the present invention from an ordinary cellulose acetate butyrate.

The coating composition comprised the following components:

| Component | Wt. % |
|---|---|
| Alftalat TM Polyester (70% in xylene) | 18.38 |
| Resimene ® Melamine | 8.58 |
| Carboxylated Cellulose Acetate Butyrate (30% in 85:15 n-butyl acetate:n-butanol) | 23.84 |
| Aluminum Stearate (7% in 90:10 xylene: isopropanol) | 12.40 |
| p-Toluenesulfonic Acid (40% in isopropanol) | 0.70 |
| Solvent (60:20:20 n-butyl acetate:xylene: isopropanol) | 28.02 |
| Aluminum Flake Pigment (65% in mineral spirits) | 8.08 |
| | 100.00 |

The carboxylated cellulose acetate butyrate employed in the composition exhibited an acid number of 20 and represented about 25% of the resin solids in the composition. The polyester resin employed is a commercial product of Hoechst, and the melamine resin is a commercial product of Monsanto. The aluminum pigment was obtained commercially from the Silberline Corporation.

The composition of the present example exhibited a No. 4 Ford Cup viscosity of 15.5 sec. at a nonvolatiles content of 35%. The composition exhibited a No. 4 Ford Cup viscosity of 14 sec. (i.e., typical spray viscosity) at a nonvolatiles content of 32.7%. The composition exhibited excellent resistance to redissolving upon application of a transparent top coat.

COMPARATIVE EXAMPLE 10

The coating composition of Example 56 was prepared as described therein, except that in place of the carboxylated cellulose acetate butyrate described in Example 56 there was employed the ordinary cellulose acetate butyrate from which the carboxylated cellulose acetate butyrate of Example 56 was produced. The resulting composition exhibited a viscosity which was too high for the composition to be employed in coatings applications.

The results of Example 56 and Comparative Example 10 demonstrate the remarkably unexpected nature of coating compositions containing the carboxylated cellulose esters of the present invention. In contrast to prior art formulations employing ordinary cellulose esters, the carboxylated cellulose ester products of the present invention provide coating compositions having relatively high solids content and, at the same time, sufficiently low viscosities to render them useful for coatings applications. In addition, the coating compositions employing the carboxylated cellulose ester products provide improved resistance to redissolving upon application of a transparent topcoat. The coating compositions of the present invention further provide aesthetically pleasingly finished coatings.

COMPARATIVE EXAMPLES 11-15

Comparative Example 10 was repeated except that the ordinary cellulose ester employed in Comparative Example 10 was replaced with cellulose acetate butyrate resins having lower molecular weights. The lower molecular weight resins were employed so that compositions having suitable viscosities for coating applications could be prepared.

The No. 4 Ford Cup viscosities of the coating compositions of Comparative Examples 11-15 were determined and are set forth in Table I below.

TABLE I

| Comp. Ex. No. | Viscosity at 35% NV | % NV at 14 Sec. |
|---|---|---|
| 11 | 85 | 19.8 |
| 12 | 60 | 20.8 |
| 13 | 33 | 24.6 |
| 14 | 17.5 | 31.0 |
| 15 | 13 | 35+ |

The results of Comparative Examples 11-13 clearly demonstrate that ordinary cellulose esters are incapable of providing the desirable combination of high solids content and low viscosity for clear-on-base coating applications. While Comparative Examples 14 and 15 have viscosities and percent nonvolatiles values comparable to those reported in Example 56 for the carboxylated cellulose ester product of the present invention, the resins employed in Comparative Examples 14 and 15 had extremely low molecular weights. Furthermore, the compositions represented by Comparative Examples 14 and 15 offered very poor resistance to redissolving upon application of a transparent topcoat. Therefore, these coating compositions based upon low molecular weight ordinary cellulose esters are undesirable for use in coatings applications.

The invention has been described in detail with particular reference to preferred embodiments thereof, but it will be understood that variations and modifications can be effected within the spirit and scope of the invention.

We claim:

1. A process for the preparation of carboxylated cellulose esters comprising the steps of
   (a) providing a cellulose ester to a reaction zone;
   (b) intimately contacting said cellulose ester in said reaction zone with a gaseous stream comprising ozone; and
   (c) reacting said cellulose ester with said ozone at a temperature of about 25° to 80° C. for a period of time sufficient to yield a carboxylated cellulose ester product having an acid number of at least about 5.

2. The process of claim 1 wherein said cellulose ester is provided to said reaction zone in solid particulate form.

3. The process of claim 1 wherein said cellulose ester is provided to said reaction zone in the form of an aqueous slurry.

4. The process of claim 1 wherein said cellulose ester is provided to said reaction zone in the form of a solution in a solvent in which both said cellulose ester and acid carboxylated cellulose ester are soluble and which is substantially unreactive with ozone.

5. The process of claim 4 wherein said solvent comprises acetic acid, formic acid, methyl isobutyl ketone, methyl amyl ketone, methyl propyl ketone, methyl ethyl ketone, acetone, or a mixture thereof.

6. The process of claim 1 wherein ozone is present in said gaseous stream in a concentration of at least about 0.25 percent by weight.

7. The process of claim 1 wherein said cellulose ester is reacted with ozone for a period of time of at least about 0.5 hours.

8. The process of claim 1 wherein said cellulose ester comprises cellulose acetate, cellulose propionate, cellulose butyrate, cellulose acetate butyrate, cellulose acetate propionate, or a mixture thereof.

9. A process for the preparation of carboxylated cellulose esters comprising the steps of
   (a) providing a cellulose ester in solid particulate form to a reaction zone;
   (b) intimately contacting said cellulose ester in said reaction zone with a gaseous stream comprising at least about 0.25 weight percent ozone; and
   (c) reacting said cellulose ester with said ozone at a temperature of about 25° to 80° C. for a period of time sufficient to yield a carboxylated cellulose ester having an acid number of at least about 5.

10. The process of claim 9 wherein said cellulose ester is reacted with said ozone for a period of time of at least about 0.5 hour.

11. The process of claim 10 wherein said cellulose ester is reacted with ozone for a period of time of about 0.5 to 24 hours.

12. The process of claim 9 wherein said cellulose ester is provided in the form of a powder.

13. The process of claim 12 where said intimate contacting is accomplished by fluidizing said powder in said gaseous stream.

14. The process of claim 9 wherein said cellulose ester comprises cellulose acetate, cellulose propionate, cellulose butyrate, cellulose acetate butyrate, cellulose acetate propionate, or a mixture thereof.

15. The process of claim 9 wherein said gaseous stream comprises about 0.5 to 4 weight percent ozone.

16. A process for the preparation of carboxylated cellulose esters comprising the steps of
   (a) providing a cellulose ester in the form of a powder to a reaction zone;
   (b) fluidizing said cellulose ester in said reaction zone with a gaseous stream comprising at least about 0.25 weight percent ozone; and
   (c) reacting said cellulose ester with ozone at a temperature of about 25° to 80° C. for a period of time of about 0.5 to 24 hours.

17. The process of claim 16 wherein said cellulose ester comprises cellulose acetate, cellulose propionate, cellulose butyrate, cellulose acetate butyrate, cellulose acetate propionate, or a mixture thereof.

18. The process of claim 17 wherein said cellulose ester comprises cellulose acetate butyrate.

19. The process of claim 16 wherein said cellulose ester is reacted with ozone at a temperature of about 50° to 75° C.

20. The process of claim 16 wherein said cellulose ester is reacted with ozone for a period of time of about 1 to 12 hours.

21. The process of claim 16 wherein said gaseous stream comprises about 0.5 to 4 weight percent ozone.

22. The process of claim 16 wherein said gaseous stream comprises about 1 to 3 weight percent ozone.

23. A process for the preparation of carboxylated cellulose esters comprising the steps of
   (a) providing to a reaction zone a cellulose ester in the form of a powder having a moisture content less than about 5 percent by weight;
   (b) fluidizing said cellulose ester in said reaction zone with a gaseous stream comprising about 1 to 3 percent by weight of ozone; and
   (c) reacting said cellulose ester with ozone at a temperature of about 50° to 75° C. for a period of time of about 1 to 12 hours.

24. The process of claim 23 wherein said cellulose ester comprises cellulose acetate, cellulose butyrate, cellulose acetate butyrate. cellulose acetate propionate, or a mixture thereof.

25. The process of claim 23 wherein said cellulose ester comprises cellulose acetate butyrate.

26. The process of claim 23 wherein said gaseous stream comprises about 90% by weight nitrogen.

27. The process for preparing carboxylated cellulose ester material comprising contacting at from about 50° C. to about 75° C., cellulose ester material with ozone fed to a fluidized bed reactor for a sufficient period to carboxylate said material, converting said reactor to a closed loop system wherein the ozone feed is terminated, recirculating the gasses present in said system at from about 70° C. to about 100° C. and adding a volatile organic acid thereto in vapor form to a concentration of from about 0.2% to about 2.2% by weight of the initial ester material charge, continuing said recirculation until the Hoeppler viscosity of the carboxylated material is between about 20 and about 200 cps. determined using a 20% by wt. solution of said material in an 85/15 weight ratio of n-butyl acetate/n-butyl alcohol and calculated from the equation $$N = T(S-D)K$$

wherein:
   T = time in seconds for the ball to pass between the reference marks in the sample;
   S = specific gravity of ball used;
   D = density of XAE sample solution at temperature of determination; and
   K = tube constant for the particular ball used,
and purging the system at elevated temperature until the total free acid content is less than about 0.5% by weight of said initial material charge.

28. The process of claim 27 wherein said water content of the starting cellulose ester material is less than about 4.0 wt. % thereof, the fluidizing stream contains from about 1.0 to about 3.0 wt. % ozone, the temperature is from about 50° C. to about 75° C., and the ozone contact time is from about 4 to about 10 hours.

29. Carboxylated cellulose ester material having an acid number of at least about 5, an inherent viscosity of from about 0.01 to about 1.00 determined according to ASTM D2857-70 procedure at 25° C. using a polymer concentration of 0.5% by weight in 60/40 by weight, phenol/tetrachloroethane solvent and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$.

30. The carboxylated cellulose ester material of claim 29 wherein the acid number is about 5 to 50, from about 30% to about 100% of the total carboxyl groups are nonsaponifiable backbone, the DP/COOH is from about 5 to about 80, and the I.V. is from about 0.07 to about 0.45.

31. The carboxylated cellulose ester material of claim 29 having a peroxide value of from about 0.05 to about 2.0.

32. The carboxylated cellulose ester material of claim 29 having an inherent viscosity of from about 0.10 to about 0.30, a lactone level of from about $9.68 \times 10^{-5}$ to about $3.22 \times 10^{-4}$, a peroxide value of from about 0.10 to about 0.8, a DP:COOH from about 8 to about 25, and an HVR of from about 0.01 to about 0.95.

33. The carboxylated cellulose ester material of claim 29 wherein said cellulose ester comprises cellulose acetate, cellulose propionate, cellulose butyrate, cellulose acetate butyrate, cellulose acetate propionate, or a mixture thereof and having a peroxide value of from about 0.05 to about 2.0.

34. The carboxylated cellulose ester material of claim 29 wherein said cellulose ester comprises cellulose acetate butyrate.

35. A clear-on-base metal coating system comprising:
(A) a nonaqueous base film comprising
   (a) a first film-forming material comprising
      (i) about 20 to 50 percent by weight of a carboxylated cellulose ester having an acid number of at least about 5 and an inherent viscosity of about 0.01 to 1.00 determined according to ASTM D2857-70 procedure at 25° C. using a polymer concentration of 0.5% by weight in 60/40 by weight, phenol/tetrachloroethane solvent, and
      (ii) correspondingly about 50 to 80 percent by weight of a film-forming resin comprising an alkyd resin, a melamine resin, a polyester resin, an acrylic resin, a urethane resin, or a mixture thereof,
   (b) uniformly dispersed pigments, and
   (c) volatile organic solvents for said first film-forming material, and
(B) a transparent coating composition deposited on said base film without substantial intermixing or intersolution of said base film and said transparent coating composition, said transparent coating composition comprising
   (a) a second film-forming material comprising an alkyd resin, a polyester resin, an acrylic resin, a urethane resin, or a mixture thereof, and
   (b) volatile organic solvents for said second film-forming material.

36. The coating system of claim 35 wherein said carboxylated cellulose ester comprises carboxylated cellulose acetate butyrate.

37. The coating system of claim 35 wherein said carboxylated cellulose ester is employed in said first film-forming material in an amount of about 25 to 40 percent by weight.

38. The coating system of claim 35 wherein the pigment comprises aluminum.

39. The coating system of claim 35 wherein said nonaqueous base film further comprises about 1 to 5% by weight, based on the total weight of the non-volatile components of said base film, of a rheology control agent.

40. The coating system of claim 39 wherein said rheology control agent comprises aluminum stearate.

41. The coating system of claim 35 wherein said second film-forming material further comprises about 10 to 30% by weight, based upon the total weight of said second film-forming material, of a carboxylated cellulose ester.

42. The coating system of claim 41 wherein said carboxylated cellulose ester comprises carboxylated cellulose acetate butyrate.

43. A metal coating which is the reaction product of approximately stoichiometric quantities of
(A) a first component consisting essentially of a reactive polyfunctional isocyanate material, and
(B) a second component comprising
   (i) about 20 to 100% by weight of a carboxylated cellulose ester having an acid number of at least about 5 and an inherent viscosity of about 0.01 to 1.00 determined according to ASTM D2857-70 procedure at 25° C. using a polymer concentration of 0.5% by weight in 60/40 by weight, phenol/tetrachloroethane solvent, and
   (ii) correspondingly about 0 to 80% by weight of a thermosetting acrylic resin.

44. The metal coating of claim 43 which further comprises a minor amount of an additive comprising flow control agents, UV absorbents, surface active agents, and mixtures thereof.

45. The metal coating of claim 43 wherein said carboxylated cellulose ester comprises carboxylated cellulose acetate butyrate.

46. The metal coating of claim 43 wherein said second component comprises about 50% by weight of said carboxylated cellulose ester.

47. A pigment dispersion comprising about 20 to 50 percent by weight of a pigment and correspondingly about 50 to 80 percent by weight of a carboxylated cellulose ester having an acid number of at least about 5 and an inherent viscosity of about 0.01 to 1.00 determined according to ASTM D2857-70 procedure at 25° C. using a polymer concentration of 0.5% by weight in 60/40 by weight, phenol/tetrachloroethane solvent.

48. The pigment dispersion of claim 47 which further comprises a solvent for said carboxylated cellulose ester.

49. The pigment dispersion of claim 47 wherein said carboxylated cellulose ester comprises carboxylated cellulose acetate butyrate.

50. The pigment dispersion of claim 47 wherein said pigment comprises a perylene, a quinacridone, a phthalocyanine, iron oxide, carbon black, or a mixture thereof.

51. A urethane wood finish comprising
(A) about 1 to 60 percent by weight, based upon the total weight of film-forming components, of a carboxylated cellulose ester having an acid number of at least about 5 and an inherent viscosity of about 0.01 to 1.00 determined according to ASTM D2857-70 procedure at 25° C. using a polymer concentration of 0.5% by weight in 60/40 by weight, phenol/tetrachloroethane solvent;
(B) 0 to about 50 percent by weight, based upon the total weight of film-forming components, of a urethane-forming polyol; and
(C) about 15 to 65 percent by weight, based upon the total weight of film-forming components, of a urethane-forming polyfunctional isocyanate.

52. The wood finish of claim 51 wherein said carboxylated cellulose ester is present in an amount of about 40 to 55% by weight.

53. The wood finish of claim 51 wherein said urethane-forming polyol is present in an amount of about 2 to 10% by weight.

54. The wood finish of claim 51 wherein said urethane-forming polyfunctional isocyanate is present in an amount of about 35 to 60 percent by weight.

55. The wood finish of claim 51 which further comprises a solvent, or mixture of solvents, which is substantially free of reactive hydroxyl groups.

56. The wood finish of claim 51 wherein said carboxylated cellulose ester comprises carboxylated cellulose acetate butyrate.

57. The wood finish of claim 51 which further comprises a catalytic amount of a tin or zinc catalyst.

58. A urethane wood finish comprising (A) about 40 to 55 percent by weight of a carboxylated cellulose ester having an acid number of at least about 5 and an inherent viscosity of about 0.01 to 1.00 determined according to ASTM D2857-70 procedure at 25° C. using a polymer concentration of 0.5% by weight in 60/40 by weight, phenol/tetrachloroethane solvent;

(B) about 2 to 10 percent by weight of a urethane-forming polyol;

(C) about 35 to 60 percent by weight of a urethane-forming polyfunctional isocyanate; and (D) a quantity of a solvent which is substantially free of reactive hydroxyl groups, or a mixture of such solvents, which is sufficient to solvate components (A) and (B).

59. The wood finish of claim 58 wherein said carboxylated cellulose ester comprises carboxylated cellulose acetate butyrate.

60. The wood finish of claim 58 which further comprises a catalytic amount of a tin or zinc catalyst.

61. A wood finish modifying lacquer which is compatible with nitrocellulose-based furniture lacquers, said modifying lacquer comprising (A) about 20 to 80 percent by weight, based upon the total weight of components (A), (B), (C), and (D), of a carboxylated cellulose ester having an acid number of at least about 5 and an inherent viscosity of about 0.01 to 1.00 determined according to ASTM D2857-70 procedure at 25° C. using a polymer concentration of 0.5% by weight in 60/40 by weight, phenol/tetrachloroethane solvent;

(B) 0 to about 50 percent by weight, based upon the total weight of components (A), (B), (C), and (D), of an alkyd resin;

(C) 0 to about 50 percent by weight, based upon the total weight of components (A), (B), (C), and (D), of a maleic resin;

(D) 0 to about 30% by weight, based upon the total weight of components (A), (B), (C), and (D), of a plasticizer; and (E) a solvating quantity of a solvent comprising a lower alkyl ester of a lower carboxylic acid, a lower alkyl ketone, a hydrocarbon having about 5 to 12 carbon atoms, a lower aliphatic alcohol, or a mixture thereof, provided that one or both of components (B) and (C) is present in a total concentration of at least about 10% by weight, based upon the total weight of components (A), (B), (C), and (D), and further provided that the total concentration of components (B) and (D) is at least about 20% by weight, based upon the total weight of components (A), (B), (C), and (D).

62. The modifying lacquer of claim 61 wherein said carboxylated cellulose ester comprises carboxylated cellulose acetate butyrate.

63. The modifying lacquer of claim 61 wherein said plasticizer comprises a phthalate plasticizer.

64. The modifying lacquer of claim 61 wherein said phthalate plasticizer comprises dioctyl phthalate.

65. An ink composition having improved color development and improved adhesion to plastic substrates, said ink composition comprising (A) about 30 to 70 percent by weight of a carboxylated cellulose ester having an acid number of at least about 5 and an inherent viscosity of about 0.01 to 1.00 determined according to ASTM D2857-70 procedure at 25° C. using a polymer concentration of 0.5% by weight in 60/40 by weight, phenol/tetrachloroethane solvent;

(B) correspondingly about 30 to 70 percent by weight of an ink pigment;

(C) an ink solvent in a quantity sufficient to provide a viscosity which is suitable for applying said ink composition; and (D) up to about 15 percent by weight, based upon the total weight of the composition, of each of one or more modifiers comprising maleic resins, acrylic resins, sucrose ester resins, phthalate plasticizers, polyester resins, urea-formaldehyde resins, or mixtures thereof, provided that the total concentration of said modifiers in said composition does not exceed about 60 percent by weight.

66. The ink composition of claim 65 wherein said carboxylated cellulose ester comprises carboxylated cellulose acetate propionate, carboxylated cellulose acetate butyrate, or a mixture thereof.

67. The ink composition of claim 65 wherein said sucrose ester comprises sucrose acetate isobutyrate.

68. The ink composition of claim 65 wherein said phthalate plasticizer comprises dioctyl phthalate, dioctyl terephthalate, dibutyl phthalate, or a mixture thereof.

* * * * *